(12) United States Patent
Shen et al.

(10) Patent No.: US 8,161,038 B2
(45) Date of Patent: Apr. 17, 2012

(54) MAINTAIN OPTIMAL QUERY PERFORMANCE BY PRESENTING DIFFERENCES BETWEEN ACCESS PLANS

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1898 days.

(21) Appl. No.: 10/977,799

(22) Filed: Oct. 29, 2004

(65) Prior Publication Data

US 2006/0106839 A1    May 18, 2006

(51) Int. Cl.
G06F 17/30    (2006.01)

(52) U.S. Cl. .................................................... 707/718

(58) Field of Classification Search .................. None
See application file for complete search history.

(56) References Cited

U.S. PATENT DOCUMENTS

| | | | |
|---|---|---|---|
| 5,794,229 A | 8/1998 | French et al. | |
| 5,960,428 A * | 9/1999 | Lindsay et al. | 707/4 |
| 6,026,391 A * | 2/2000 | Osborn et al. | 707/2 |
| 6,321,218 B1 | 11/2001 | Guay et al. | |
| 6,360,214 B1 * | 3/2002 | Ellis et al. | 1/1 |
| 6,366,901 B1 * | 4/2002 | Ellis | 1/1 |
| 6,466,931 B1 * | 10/2002 | Attaluri et al. | 707/2 |
| 6,847,978 B2 * | 1/2005 | Ellis et al. | 707/713 |
| 7,007,009 B2 * | 2/2006 | Bestgen et al. | 707/3 |
| 7,031,958 B2 * | 4/2006 | Santosuosso | 707/3 |
| 2002/0198867 A1 * | 12/2002 | Lohman et al. | 707/3 |
| 2003/0093408 A1 * | 5/2003 | Brown et al. | 707/2 |
| 2003/0115183 A1 * | 6/2003 | Abdo et al. | 707/3 |
| 2003/0115212 A1 * | 6/2003 | Hornibrook et al. | 707/103 R |
| 2003/0182276 A1 | 9/2003 | Bossman et al. | |
| 2003/0200204 A1 * | 10/2003 | Limoges et al. | 707/3 |
| 2003/0212668 A1 | 11/2003 | Hinshaw et al. | |
| 2004/0210579 A1 | 10/2004 | Dettinger et al. | |
| 2004/0225639 A1 * | 11/2004 | Jakobsson et al. | 707/2 |
| 2005/0065928 A1 * | 3/2005 | Mortensen et al. | 707/5 |
| 2005/0108199 A1 * | 5/2005 | Ellis et al. | 707/2 |
| 2006/0031189 A1 * | 2/2006 | Muras et al. | 707/2 |
| 2006/0085375 A1 * | 4/2006 | Egan et al. | 707/1 |

OTHER PUBLICATIONS

U.S. Appl. No. 10/354,802, entitled "Data Management System that Provides Intelligent Access Plan Caching," filed Jan. 30, 2003 by Craig S. Aldrich et al.
U.S. Appl. No. 10/860,402, entitled "Apparatus and Method for Autonomically Generating a Query Implementation that Meets a Defined Performance Specification," filed Jun. 30, 2004 by Paul R. Day et al.

* cited by examiner

*Primary Examiner* — Bai D. Vu

(74) *Attorney, Agent, or Firm* — Owen J. Gamon

(57) ABSTRACT

A method, apparatus, system, and signal-bearing medium that, in an embodiment, collect previous and current statistics based on previous and current access plans, respectively, and a query. The previous and current statistics are compared in response to an event, and the differences between the previous and current statistics are presented. In various embodiments, the event may be a change to logic in a database management system that performs the query, a degradation in performance of the query, or a user request. In various embodiments, the difference may be a change to the previous access plan that causes performance degradation of the query, such as missing an index. The previous access plan is copied into the current access plan if an estimated processing time for the current access plan is greater than an estimated processing time for the previous access plan. The current access plan is used to perform the query.

20 Claims, 3 Drawing Sheets

MAINTAIN OPTIMAL QUERY PERFORMANCE BY PRESENTING DIFFERENCES BETWEEN ACCESS PLANS

CROSS-REFERENCE TO RELATED APPLICATIONS

The present application is related to commonly-assigned patent application Ser. No. 10/354,802, to Craig S. Aldrich et al., filed Jan. 30, 2003, entitled "Data Management System that Provides Intelligent Access Plan Caching," which is herein incorporated by reference. The present application is also related to commonly-assigned patent application Ser. No. 10/860,402, to Paul R. Day et al., filed Jun. 30, 2004, entitled "Apparatus and Method for Autonomically Generating a Query Implementation that Meets a Defined Performance Specification," which is herein incorporated by reference.

FIELD

This invention generally relates to computer database management systems and more specifically relates to determining and presenting differences between query statistics for current and previous access plans used by the query.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a database management system (DMS), which may also be called a database system or simply a database.

Many different types of databases are known, but the most common is usually called a relational database (RDB), which organizes data in tables that have rows, which represent individual entries or records in the database, and columns, which define what is stored in each entry or record. Each table has a unique name within the database and each column has a unique name within the particular table. The database also has an index, which is a data structure that informs the database management system of the location of a certain row in a table given an indexed column value, analogous to a book index informing the reader on which page a given word appears.

To be useful, the data stored in databases must be capable of being retrieved in an efficient manner. The most common way to retrieve data from a database is through statements called database queries. A query is an expression evaluated by the database management system. Queries may be issued programmatically via applications or via a user interface. As one might imagine, queries range from being very simple to very complex. When the database management system receives a query, the database management system interprets the query and determines what internal steps are necessary to satisfy the query. These internal steps may include an identification of the table or tables specified in the query, the row or rows selected in the query, and other information such as whether to use an existing index, whether to build a temporary index, whether to use a temporary file to execute a sort, and/or the order in which the tables are to be joined together to satisfy the query.

When taken together, these internal steps are referred to as an execution plan or an access plan. The access plan is typically created by a software component that is often called a query optimizer. The query optimizer may be part of the database management system or separate from but in communication with the database management system. When a query optimizer creates an access plan for a given query, the access plan is often saved by the database management system in the program object, e.g., the application program, that requested the query. The access plan may also be saved in an SQL (Structured Query Language) package or an access plan cache. Then, when the user or program object repeats the query, which is a common occurrence, the database management system can find and reutilize the associated saved access plan instead of undergoing the expensive and time-consuming process of recreating the access plan. Thus, reusing access plans increases the performance of queries when performed by the database management system.

For complex queries that are frequently executed, users may spend substantial time fine-tuning the access plan, in order to achieve the best possible performance. Once the access plan has been properly tuned, users naturally expect the query to keep performing well in the future. Unfortunately, an access plan that experienced acceptable or even optimal performance when it was initially created may experience significant performance degradation later because of changes that have occurred to the organization of the target database or changes that have occurred in the database management system, e.g., changes due to a new operating system release for the computer system. For example, the database that is the target of the query may have indexes added, changed, or removed (either intentionally or inadvertently), which can dramatically impact the performance of the previously tuned and saved access plan.

Users may have a very limited awareness of the source of or reason for these changes that have affected the performance of their queries. They may merely know that suddenly their queries are running much slower without any idea of the reason why. Further, the more complicated the query and its associated access plan, the more difficulty users experience when attempting to determine the source of the performance degradation.

Thus, without a better way to handle changes to databases and operating systems, users will continue to suffer difficulty in diagnosing and solving performance problems related to queries.

SUMMARY

A method, apparatus, system, and signal-bearing medium are provided that in an embodiment collect previous and current statistics based on previous and current access plans, respectively, and a query. The previous and current statistics are compared in response to an event, and the differences between the previous and current statistics are presented. In various embodiments, the statistics may include the name of the query, the library of each file associated with the query, each index that is associated with each used file, the number of records retrieved by the query, the most-frequently used field list for each file, the number of average duplicated values returned by the query, and/or an identification of the best access plan for the query. The statistics may also include the join order of tables associated with the query, join pairs for each join dial, each index that is in use for each dial in the query implementation, and/or the estimated processing time for the associated query. The statistics may also include a field value associated with the query if the field value is skewed from a historical average.

In various embodiments, the event may be a change to logic in a database management system that performs the query, a degradation in performance of the query, or a user request. In various embodiments, the difference may be a change to the previous access plan that causes performance degradation of the query, such as a change to an index. The previous access plan is copied into the current access plan if an estimated processing time for the current access plan is greater than an estimated processing time for the previous access plan. The current access plan is used to perform the query.

In this way, in an embodiment, the source of a performance problem may be more easily diagnosed and resolved.

BRIEF DESCRIPTION OF THE DRAWINGS

Various embodiments of the present invention are hereinafter described in conjunction with the appended drawings.

DETAILED DESCRIPTION

In an embodiment, a statistics collection engine collects previous statistics based on a query and a previous access plan and collects current statistics based on a current access plan and the query. In various embodiments, the statistics may include the name of the query, the library of each file associated with the query, each index that is associated with each used file, the number of records retrieved by the query, the most-frequently used field list for each file, the number of average duplicated values returned by the query, and/or an identification of the best access plan for the query. The statistics may also include the join order of tables associated with the query, join pairs for each join dial, each index that is in use for each dial in the query implementation, and/or the estimated processing time for the associated query. The statistics may also include a field value associated with the query if the field value is skewed from a historical average.

In response to an event, a test engine compares the previous statistics and the current statistics and presents a difference between them. A user, such as a system administrator or a submitter (human or program) of the query may use the difference to diagnose the source of the problem. In various embodiments, the event may be a change to logic in a database management system that performs the query, a degradation in performance of the query, or a user request. In various embodiments, the difference may be any change between the previous access plan and the current access plan, such as a change that causes performance degradation of the query. An example of such a change is a change (addition, deletion, or modification) to an index. In an embodiment, if performance has degraded from the previous to the current access plan, the source of the problem is likely reflected in the difference between the current and the previous statistics. In this way, by presenting the difference between the current statistics associated with the current access plan and the previous statistics associated with the previous access plan, the source of a performance problem may be more easily diagnosed and resolved.

Figure 1:
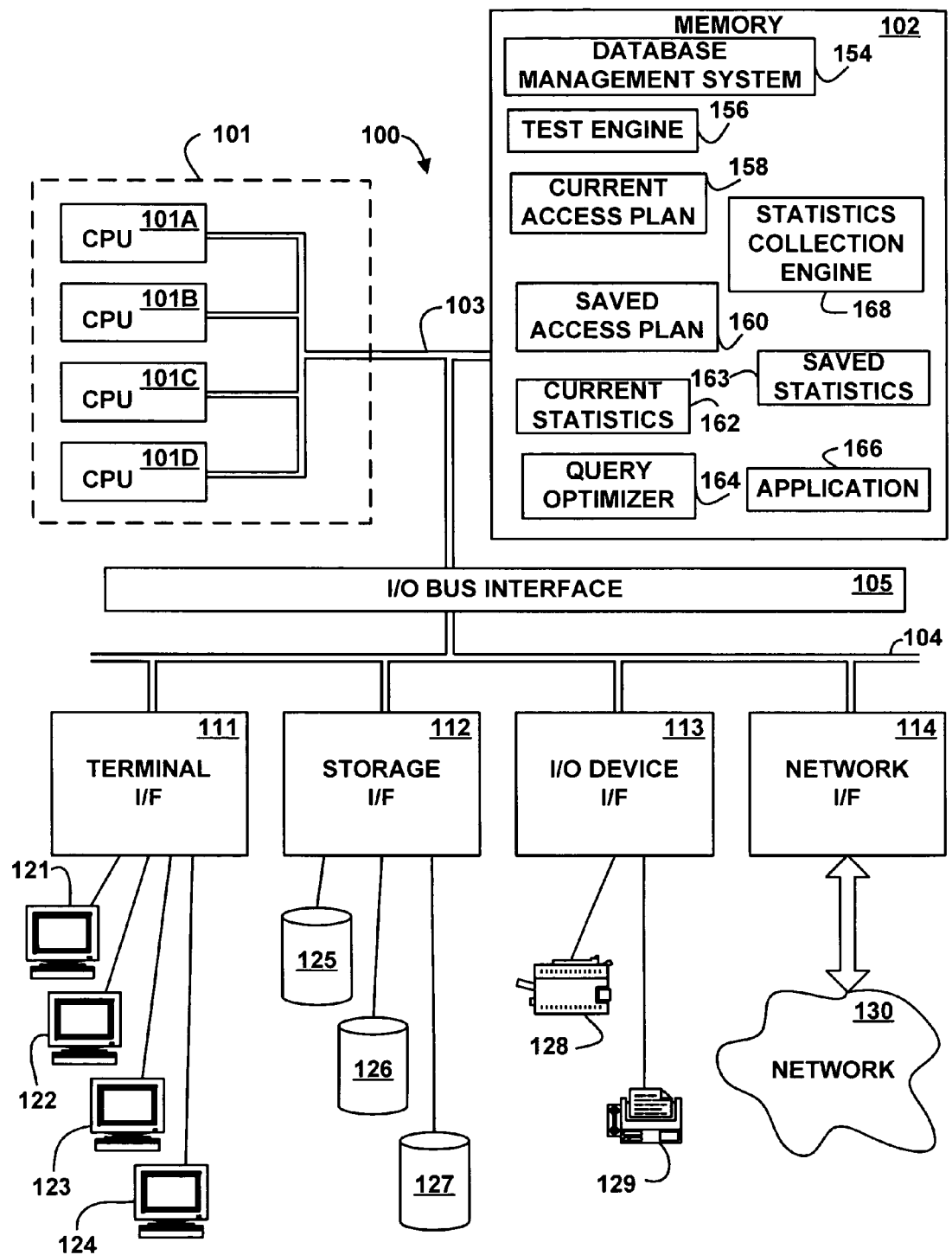
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an IBM eServer iSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a database management system 154, a test engine 156, a current access plan 158, a saved access plan 160, current statistics 162, saved statistics 163, a query optimizer 164, an application 166, and a statistics collection engine 168. Although the database management system 154, the test engine 156, the current access plan 158, the saved access plan 160, the current statistics 162, the saved statistics 163, the query optimizer 164, the application 166, and the statistics collection engine 168 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 154, the test engine 156, the current access plan 158, the saved access plan 160, the current statistics 162, the saved statistics 163, the query optimizer 164, the application 166, and the statistics collection engine 168 are illustrated as being contained within the main memory 102, these elements are not necessarily all completely contained in the same storage device at the same time.

Further, although the database management system 154, the test engine 156, the current access plan 158, the saved access plan 160, the current statistics 162, the saved statistics 163, the query optimizer 164, the application 166, and the statistics collection engine 168 are illustrated as being separate entities, in other embodiments some of them, or portions of some of them, may be packaged together. For example, in various embodiments some or all of the database management system 154, the test engine 156, the query optimizer 164, and the statistics collection engine 168 may be packaged together. As a further example, in various embodiments the current access plan 158 and the saved access plan 160 may be packaged with the application 166.

The database management system 154 includes data, e.g., organized in rows and columns, indexes used to access the data, and logic that performs a query against the data using the current access plan 158. The query optimizer 164 creates the current access plan 158, which in various embodiments may include an identification of the table or tables in the database management system 154 specified in the query, the row or rows selected in the query, and other information such as whether to use an existing index, whether to build a temporary index, whether to use a temporary file to execute a sort, and/or the order in which the tables are to be joined together to satisfy the query. The saved access plan 160 is a saved version of an access plan, which the database management system 154 used to execute the query the previous time the query was performed.

The application 166 sends queries to the database management system 154. The statistics collection engine 168 collects data regarding the query and the current access plan 158 and saves the data to the current statistics 162. The statistics collection engine 168 is further described below with reference to FIG. 2.

In various embodiments, the current statistics 162 may include the name of the query, the library of each file associated with the query, each index that is associated with each used file, regardless of whether the index is chosen in the query implementation, the number of records retrieved by the query, the most-frequently used field list for each file, the number of average duplicated values returned by the query, and/or an identification of the best access plan for the associated query. The current statistics 162 may also include the join order of tables associated with the query, join pairs for each join dial, each index that is in use for each dial in the query implementation, and/or the estimated processing time for the associated query. The saved statistics 163 are a previous version of the current statistics 162 and are associated with the saved access plan 160.

The test engine 156 chooses between the current access plan 158 or the saved access plan 160 for the database management system 154 to use when executing a query. The test engine 156 further reports the difference between the current statistics 162 and the saved statistics 163. The test engine 156 is further described below with reference to FIG. 3.

In an embodiment, the test engine 156 and the statistics collection engine 168 include instructions capable of executing on the processor 101 or statements capable of being interpreted by instructions executing on the processor 101 to perform the functions as further described below with reference to FIGS. 2 and 3. In another embodiment, the test engine 156 and the statistics collection engine 168 may be implemented in microcode. In another embodiment, the test engine 156 and the statistics collection engine 168 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
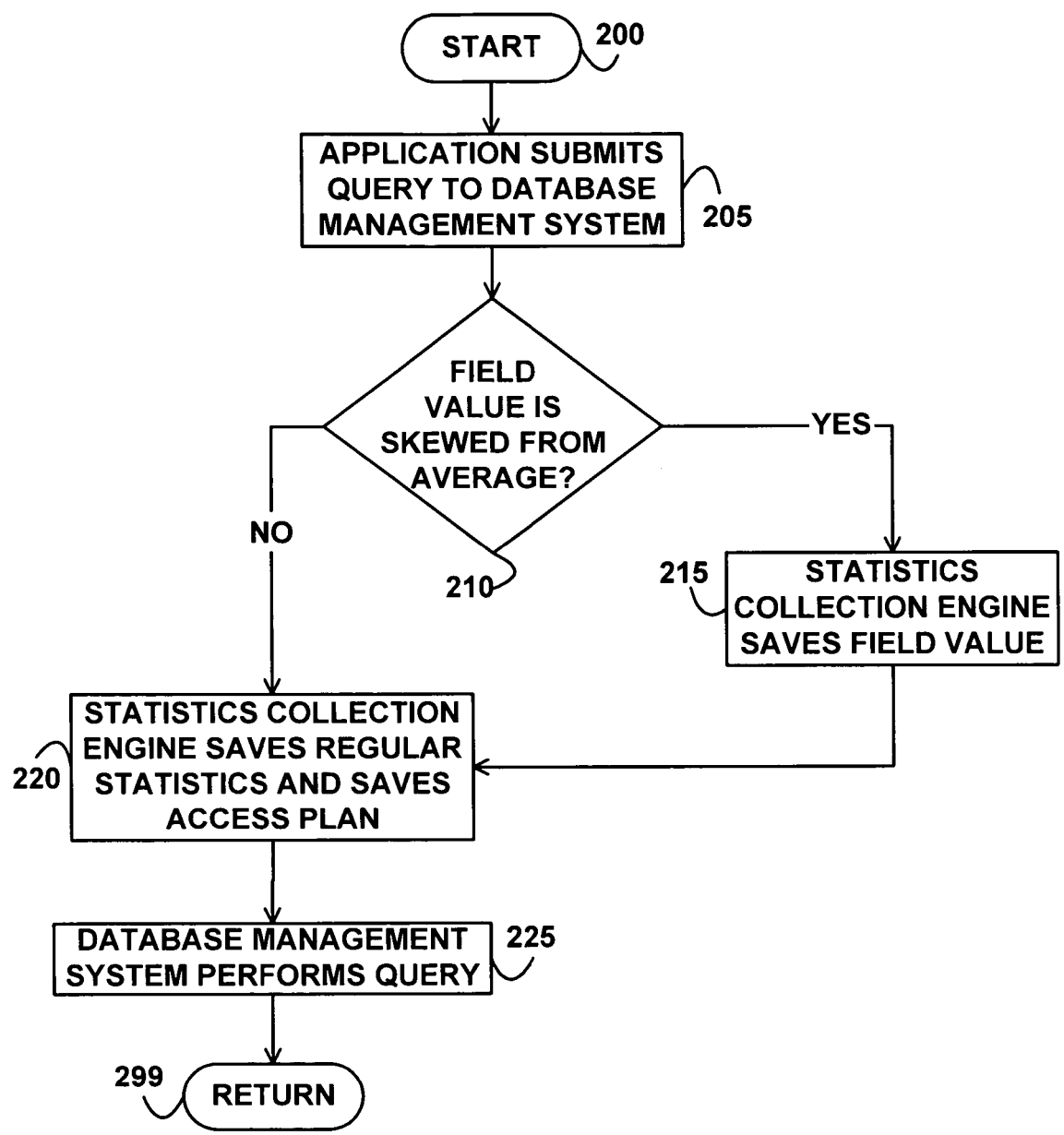
FIG. 2 depicts a flowchart of example processing for a statistics collection engine, according to an embodiment of the invention.

FIG. 2 depicts a flowchart of example processing for the statistics collection engine 168, according to an embodiment of the invention. Control begins at block 200. Control then continues to block 205 where the application 166 submits a query to the database management system 154. Control then continues to block 210 where the database management system 154 invokes the statistics collection engine 168, which determines whether a field value used by the query is skewed from the average field used historically. For example, in an embodiment, the statistics collection engine 168 determines whether a field value used by the query is different from the historical average by an amount that is greater than a threshold.

If the determination at block 210 is true, then the field value is skewed from the historical average, so control continues to block 215 where the statistics collection engine 168 saves the field value in the current statistics 162. Control then continues to block 220 where the statistics collection engine 168 saves performance statistics related to the query and the current access plan 158 into the current statistics 162 and further saves the current access plan 158 into the saved access plan 160.

In various embodiments, the performance statistics include the name of the query, the library of each file associated with the query, each index that is associated with each used file, regardless of whether the index is chosen in the query implementation, the number of records retrieved by the query, the most-frequently used field list for each file, the number of average duplicated values returned by the query, and/or an identification of the best access plan for the associated query. The statistics may also include the join order of tables associated with the query, join pairs for each join dial, each index that is in use for each dial in the query implementation, and/or the estimated processing time for the associated query.

Control then continues to block 225 where the database management system 154 performs the query using the current access plan 158. Control then continues to block 299 where the logic of FIG. 2 returns.

If the determination at block 210 is false, then the field value is not skewed from the historical average, so control continues from block 210 to block 220, as previously described above.

Figure 3:
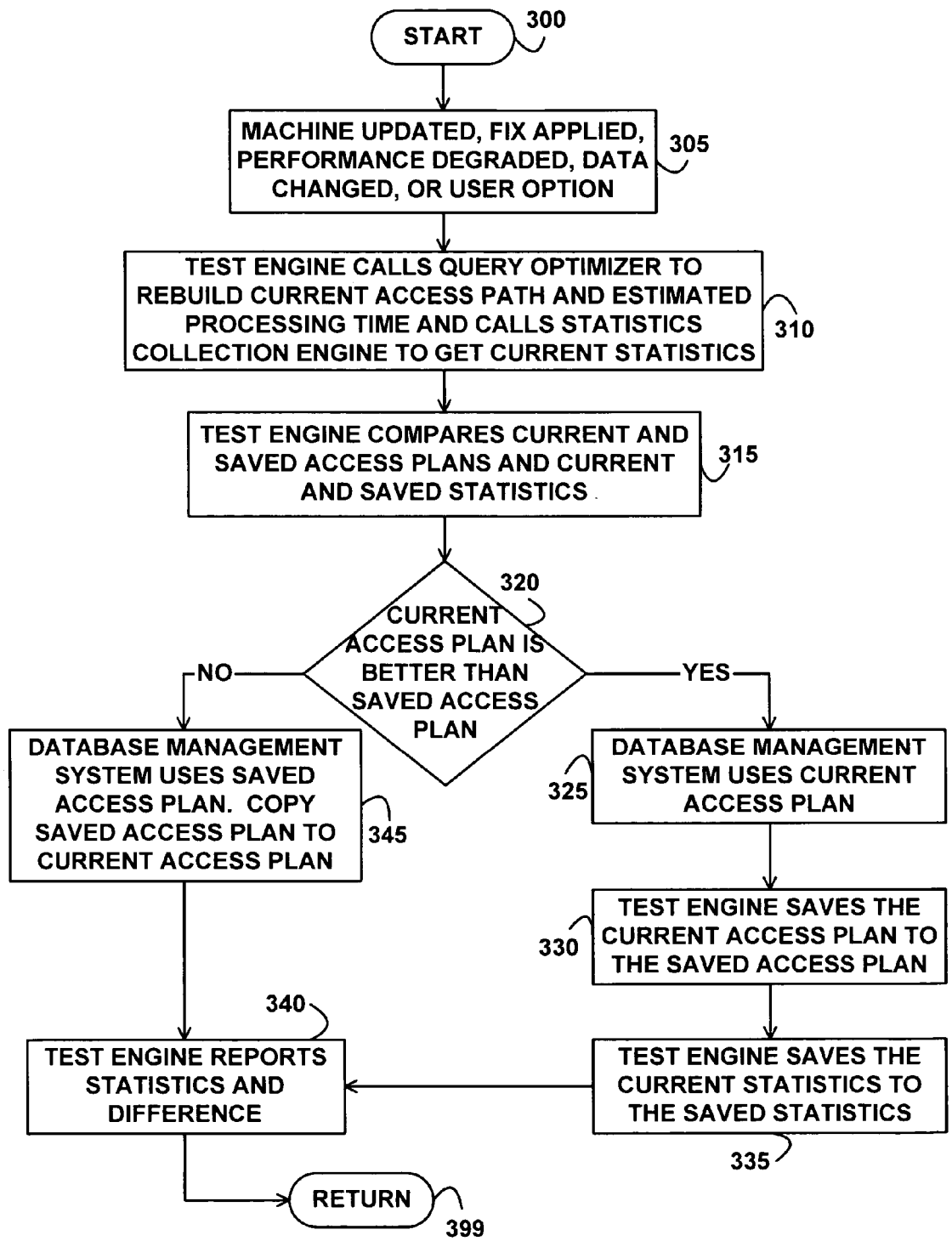
FIG. 3 depicts a flowchart of example processing for a test engine, according to an embodiment of the invention.

FIG. 3 depicts a flowchart of example processing for the test engine 156, according to an embodiment of the invention. Control begins at block 300. Control then continues to block 305 where the computer system 100 is updated with a new version of an operating system, a fix, update, new release, or any other change is applied to the logic of the database management system 154, performance of the computer system 100 or the database management system 154 has degraded more than a threshold amount, or a user (e.g. a system administrator or the user submitting the query) or the application 166 makes a request to test the current access plan 158.

Control then continues to block 310 where the test engine 156 invokes the query optimizer 164 with a request to build or rebuild the current access plan 158 and a request to return the estimated processing time for the current access plan 158. The test engine 156 further invokes the statistics collection engine 168 with a request to return the current statistics 162 associated with the current access plan 158.

Control then continues to block 315 where the test engine 156 compares the estimated processing time for the current access plan 158 to the estimated processing time for the saved access plan 160. The test engine 156 further compares the current statistics 162 associated with the current access plan 158 to the saved statistics 163 associated with the saved access plan 160.

Control then continues to block 320 where the test engine 156 determines whether the current access plan 158 is better than the saved access plan 160 by determining whether the estimated processing time for the current access plan 158 is less than or equal to the estimated processing time for the saved access plan 160.

If the determination at block 320 is true, then the estimated processing time for the current access plan 158 is less than or equal to the estimated processing time for the saved access plan 160, so control continues to block 325 where the test engine 156 instructs the database management system 154 to use the current access plan 158. Control then continues to block 330 where the test engine 156 saves the current access plan 158 into the saved access plan 160. Control then continues to block 335 where the test engine 156 saves the current statistics 162 into the saved statistics 163. Control then continues to block 340 where, in various embodiments, the test engine 156 presents or reports the current statistics 162, the current statistics 162 and the saved statistics 163, and/or the difference between the current statistics 162 and the saved statistics 163. In various embodiments, the test engine 156 makes the presentation via a message, a printer, a user interface, an email, an image, a video, a notification, an audio speaker, via invoking a program or method, or via any other appropriate technique.

Control then continues to block 399 where the logic of FIG. 3 returns.

If the determination at block 320 is false, then the estimated processing time for the current access plan 158 is greater than the estimated processing time for the saved access plan 160, so control continues to block 345 where the test engine 156 instructs the database management system 154 to use the saved access plan 158 and copies the saved access plan 160 into the current access plan 158. Control then continues to block 340 where, in various embodiments, the test engine 156 presents or reports the current statistics 162, the current statistics 162 and the saved statistics 163, and/or the difference between the current statistics 162 and the saved statistics 163, as previously described above.

Control then continues to block 399 where the logic of FIG. 3 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    collecting previous statistics based on a query and a previous access plan;
    collecting current statistics based on the query and a current access plan;
    comparing the current statistics to the previous statistics in response to a change to logic in a database management system that performs the query, wherein the change to the logic comprises a new version of an operating system;
    copying the previous access plan into the current access plan if an estimated processing time for the current access plan is greater than an estimated processing time for the previous access plan in response to the change to the logic, wherein the current access plan is used to perform the query; and
    reporting a difference between the current statistics and the previous statistics based on the comparing.

2. The method of claim 1, wherein the difference comprises a change to the previous access plan that causes performance degradation of the query.

3. The method of claim 1, wherein the difference comprises an addition of an index.

4. The method of claim 1, wherein the difference comprises a deletion of an index.

5. An apparatus comprising:
    means for collecting previous statistics based on a query and a previous access plan;
    means for collecting current statistics based on the query and a current access plan;
    means for comparing the current statistics to the previous statistics in response to a change to logic in a database management system that performs the query, wherein the change to the logic comprises a new version of an operating system;
    means for determining whether an estimated processing time for the current access plan is greater than an estimated processing time for the previous access plan in response to the change to the logic; and means for reporting a difference between the current statistics and the previous statistics based on the comparing.

6. The apparatus of claim 5, wherein the difference comprises a change to the previous access plan that causes performance degradation of the query.

7. The apparatus of claim 5, wherein the difference comprises an addition of an index.

8. The apparatus of claim 5, wherein the difference comprises a deletion of an index.

9. A storage medium encoded with instructions, wherein the instructions when executed comprise:
collecting previous statistics based on a query and a previous access plan;
collecting current statistics based on the query and a current access plan;
comparing the current statistics to the previous statistics in response to a change to logic in a database management system that performs the query, wherein the change to the logic comprises a new version of an operating system;
copying the previous access plan into the current access plan if an estimated processing time for the current access plan is greater than an estimated processing time for the previous access plan in response to the change to the logic, wherein the current access plan is used to perform the query; and
reporting a difference between the current statistics and the previous statistics based on the comparing.

10. The storage medium of claim 9, further comprising:
determining whether a field value associated with the query is skewed from a historical average.

11. The storage medium of claim 10, further comprising:
saving the field value in the current statistics if the determining is true.

12. The storage medium of claim 9, wherein the difference comprises a change to the previous access plan that causes performance degradation of the query.

13. A computer system comprising: a processor; and
a storage device encoded with instructions, wherein the instructions when executed on the processor comprise:
collecting previous statistics based on a query and a previous access plan,
collecting current statistics based on the query and a current access plan,
comparing the current statistics to the previous statistics in response to a change to logic in a database management system that performs the query, wherein the change to the logic comprises a new version of an operating system,
copying the previous access plan into the current access plan if an estimated processing time for the current access plan is greater than an estimated processing time for the previous access plan in response to the change to the logic, wherein the current access plan is used to perform the query, and
reporting a difference between the current statistics and the previous statistics based on the comparing.

14. The computer system of claim 13, wherein the instructions further comprise:
saving a field value associated with the query into the current statistics if the field value is skewed from a historical average.

15. The computer system of claim 13, wherein the current statistics and the previous statistics are selected from a group consisting of:
a name of the query, a library of each file associated with the query, each index that is associated with each used file, a number of records retrieved by the query, a most-frequently used field list for each file, a number of average duplicated values returned by the query, an identification of a best access plan for the query, a join order of tables associated with the query, join pairs for each join dial, each index that is in use for each dial in the query, an estimated processing time for the query, a field value associated with the query if the field value is skewed from a historical average.

16. The computer system of claim 13, wherein the difference comprises a change to the previous access plan that causes performance degradation of the query.

17. A method for configuring a computer, comprising:
configuring the computer to collect previous statistics based on a query and a previous access plan;
configuring the computer to collect current statistics based on the query and a current access plan;
configuring the computer to compare the current statistics to the previous statistics in response to a change to logic in a database management system that performs the query, wherein the change to the logic comprises a new version of an operating system;
configuring the computer to copy the previous access plan into the current access plan if an estimated processing time for the current access plan is greater than an estimated processing time for the previous access plan in response to the change to the logic, wherein the current access plan is used to perform the query; and
configuring the computer to report a difference between the current statistics and the previous statistics based on the configuring the computer to compare.

18. The method of claim 17, wherein the difference comprises a change to the previous access plan that causes performance degradation of the query.

19. The method of claim 17, wherein the difference comprises an addition of an index.

20. The method of claim 17, wherein the difference comprises a deletion of an index.

* * * * *